US005598198A

United States Patent [19]

Taylor et al.

[11] Patent Number: 5,598,198

[45] Date of Patent: Jan. 28, 1997

[54] PRINTER INK REGULATION SYSTEMS

[75] Inventors: Thomas N. Taylor, Rochester; Robert A. Panos, Penfield, both of N.Y.

[73] Assignee: Xerox Corporation, Stamford, Conn.

[21] Appl. No.: 368,564

[22] Filed: Jan. 4, 1995

[51] Int. Cl.[6] .............................. G01D 15/18; B41J 2/175

[52] U.S. Cl. .................................................. 347/85; 347/7

[58] Field of Search ....................................... 347/85, 6, 7

[56] References Cited

U.S. PATENT DOCUMENTS

| | | | |
|---|---|---|---|
| 3,761,953 | 9/1973 | Helgeson et al. . | |
| 4,074,284 | 2/1978 | Dexter et al. . | |
| 4,084,165 | 4/1978 | Skafvenstedt | 347/7 |
| 4,323,907 | 4/1982 | Italiano . | |
| 4,506,276 | 3/1985 | Kyser et al. . | |
| 4,558,995 | 12/1985 | Furukawa et al. . | |
| 4,602,662 | 7/1986 | Eremity et al. . | |
| 4,639,738 | 1/1987 | Young et al. | 347/85 |
| 4,677,447 | 6/1987 | Nielsen . | |
| 4,737,801 | 4/1988 | Ichihashi et al. . | |
| 4,737,802 | 4/1988 | Mielke . | |
| 4,852,854 | 8/1989 | Peng et al. . | |
| 5,309,179 | 5/1994 | Agbezuge et al. . | |

*Primary Examiner*—Valerie A. Lund
*Attorney, Agent, or Firm*—Fay, Sharpe, Beall, Fagan, Minnich & McKee

[57] ABSTRACT

An ink jet printhead includes a mounting frame, an ink supply reservoir secured to the mounting frame and a valve housing secured to the mounting frame, the valve housing including an ink chamber. An ink supply fitting is supported in the mounting frame and includes a bore having a first end communicating with the ink supply reservoir and a second end communicating with the valve housing for feeding ink from the ink supply reservoir to the ink chamber. The fitting includes a valve seat in the bore. A valve member located in the valve housing is mounted for reciprocation in the ink supply fitting bore for selectively sealing against the valve seat in the fitting. A support member supports the valve member so that the valve member can reciprocate in relation to the valve seat to selectively allow a flow of ink into the ink chamber. The valve responds to reduced ink pressure in the ink chamber upon ejection of ink therefrom by a head assembly to open and admit ink into the ink chamber by flow from the reservoir through the fitting.

20 Claims, 6 Drawing Sheets

FIG. 2
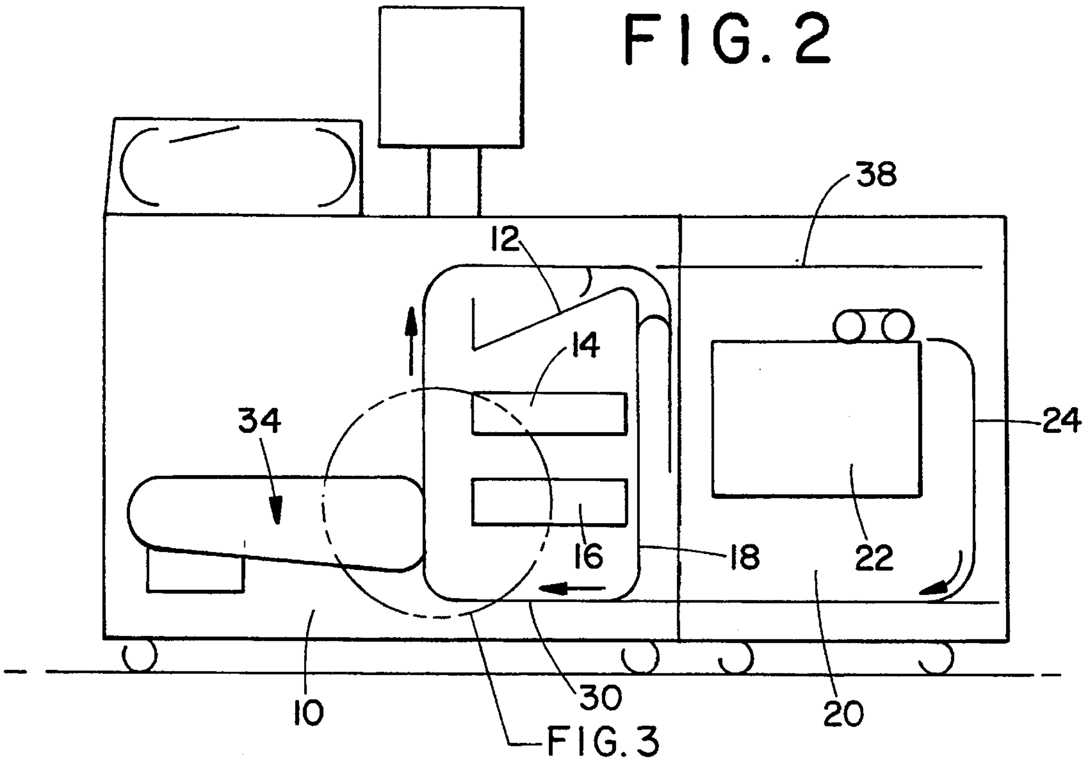
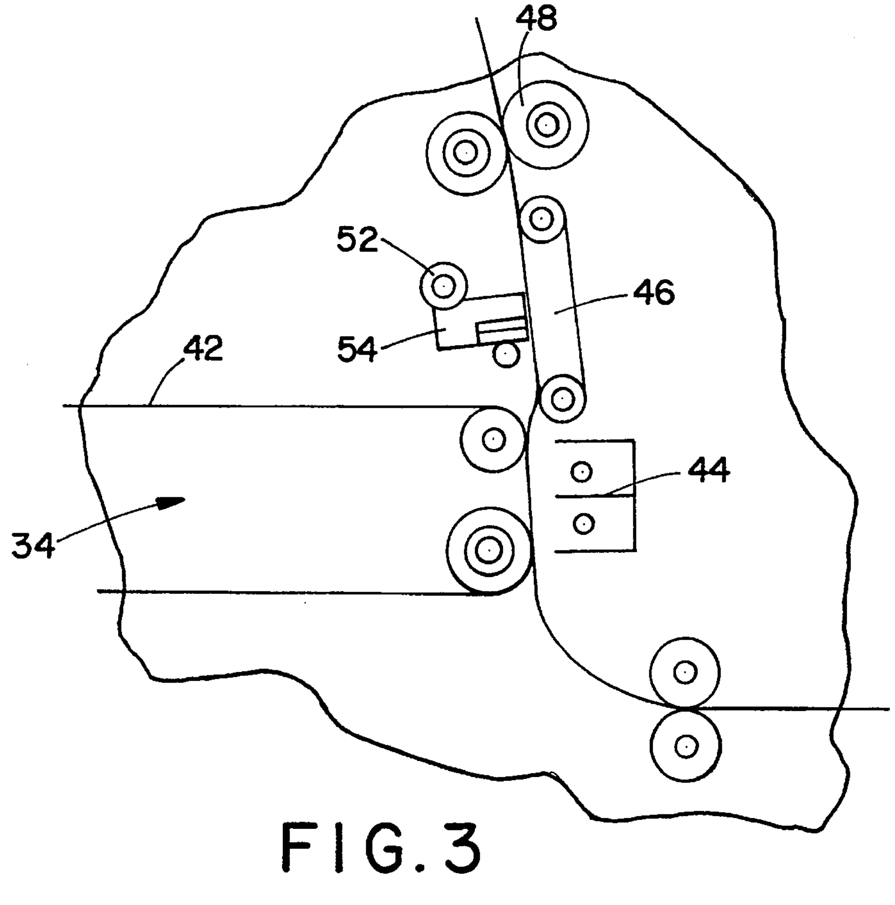
FIG. 3

PRINTER INK REGULATION SYSTEMS

BACKGROUND OF THE INVENTION

This invention relates to office machines. More particularly, the present invention relates to an ink regulation system for the printer of an office machine.

One such office machine is an electrophotographic printing apparatus. In apparatus of this type commonly used today, a photoconductive insulating member is typically charged to a uniform potential and thereafter exposed to a light image of an original document to be reproduced. The exposure discharges the photoconductive insulating surface in exposed or background areas and creates an electrostatic latent image on the member which corresponds to the image contained within the original document. Alternatively, a light beam may be modulated and used to selectively discharge portions of the charged photoconductive surface to record the desired information thereon. Typically, such a system employs a laser beam. Subsequently, the electrostatic latent image on the photoconductive insulating surface is made visible by developing the image with developer powder referred to in the art as "toner." Most development systems employ developer which comprises both charged carrier particles and charged toner particles which triboelectrically adhere to the carrier particles. During development, the toner particles are attracted from the carrier particles by the charged pattern of the image areas of the photoconductive insulating area to form a powder image on the photoconductive area. This toner image may be subsequently transferred to a support surface, such as a sheet of copy paper to which it may be permanently affixed by heating or by the application of pressure.

In commercial applications of such products, the photoconductive member has typically been configured in the form of a belt or drum moving at high speed in order to provide high speed multiple copying from an original document.

It is known to have a reproduction machine such as an electrophotographic copier with a main copying station for copying a set of documents. After the documents are copied, they are bound. A document finishing section of such a machine can include a printing station for printing on the binding of a book. The printing station can print on a binder tape before the book is bound, or the printer can print directly on the binding after the book is bound. Either ink jet printers or impact type printers can be utilized. Such an apparatus is disclosed in U.S. Pat. No. 5,174,556. Although this known apparatus prints on the binding of a book, it does not enable printing directly on each sheet of paper as it emerges from the printer station of the electrophotographic copier.

However, it is now considered desirable to provide a machine operator the option of producing a printed sheet which has on it not only the information from a primary printer, but also an auxiliary printed indicium produced by an auxiliary printer which is selectively employed.

It would also be advantageous to allow the auxiliary printer to be readily detached from the office machine for replacement or maintenance as desired. Moreover, it would be advantageous to allow the user of the office machine to custom mix a desired color of ink for the auxiliary printer, or to use different colors of ink for different printing jobs.

Ink jet printing units are by now well known. An ink jet printer which is encased in a printer head unit that is detachably mounted on a carriage is also known. Such a unit is disclosed in U.S. Pat. No. 4,800,398. However, this unit does not have an on board and readily detachable ink container to allow the operator to custom mix ink for custom color or to use premixed custom colors. In addition, neither this unit nor the other known ink jet printers are capable of handling large volumes of ink rapidly.

Accordingly, it has been considered desirable to develop a new and improved printer ink regulation system which would overcome the foregoing difficulties and others while providing better and more advantageous overall results.

BRIEF SUMMARY OF THE INVENTION

In accordance with the present invention, a new and improved ink jet printhead is provided.

More particularly in accordance with the invention, the ink jet printhead comprises a mounting frame and an ink supply reservoir secured to the mounting frame. A valve housing is operably secured to the mounting frame with the valve housing including an ink chamber. A fitting is supported in the mounting frame and includes a bore having a first end communicating with the ink supply reservoir and a second end communicating with the valve housing for feeding ink from the ink supply reservoir to the ink chamber. The fitting includes a valve seat in the bore. A valve member is located in the valve housing, the valve member having a sealing surface for cooperating with the valve seat to selectively seal thereagainst and prevent a flow of ink into the ink chamber. A support means located in the ink chamber provides support for the valve member so that the valve member can reciprocate in relation to the valve seat to selectively allow a flow of ink into the ink chamber. The valve responds to reduced ink pressure in the ink chamber upon ejection of ink therefrom to open and admit ink into the housing ink chamber by flow from the reservoir through the fitting bore.

Preferably, the system further comprises an ink conduit connected at one end to the valve housing and communicating with the ink chamber and a shut-off valve located in the ink conduit for selectively allowing a flow of ink therethrough. The support means can comprise a diaphragm with the system further comprising a prime button secured to the diaphragm for selectively priming the system by filling the valve housing ink chamber. Alternatively, the support means can comprise an elastic diaphragm secured around its circumference to the valve housing and the system can further comprise a linkage for securing the valve member to the diaphragm. If desired, the ink supply reservoir can be located at a higher elevation than the valve housing for supplying ink by gravity induced flow to the valve housing. If desired, the valve housing can comprise a bowl and the support means can comprise a float pivotally secured in the bowl.

In accordance with another aspect of the present invention, a method for regulating a flow of ink from an ink supply reservoir to an ink jet printhead is provided.

More particularly in accordance with the invention, the method comprises the steps of providing an ink supply reservoir and a valve housing including a valve member and a support element located in the valve housing and supporting the valve member and communicating the ink supply reservoir with the valve housing through a path. The support element is moved in the valve chamber to move the valve member and allow a flow of ink through the path into the valve chamber in response to a reduced level of ink in the valve housing.

Preferably, the method further comprises the step of inducing a gravity aided flow of ink from the ink supply reservoir into the valve housing when the valve member moves. In another embodiment, the method further comprises the step of positively pressurizing the ink supply and wherein the valve member opens to admit ink into the valve housing by pressure induced flow from the reservoir. The method can further comprise the step of ejecting ink by a head assembly wherein the step of moving the support element is in response to a reduced ink level in the valve housing, the reduced ink level being caused by the step of ejecting ink. The step of moving the support element can comprise the subsidiary step of pivoting the support element.

One advantage of the present invention is the provision of a new and improved office machine.

Another advantage of the present invention is the provision of an ink jet printhead which can be employed as an auxiliary printer in an office machine to enable the printing of additional information on a sheet which has been printed on by a main printer.

Still another advantage of the present invention is the provision of an ink jet printhead which has a readily removable ink container. In this way, a user can detach the ink container and custom mix ink for custom colors or use a selected ink container with premixed colors. Also, the ink container can be readily replaced with another ink container having a different color ink as desired.

Yet another advantage of the present invention is the provision of a printer ink regulation system which is capable of handling large volumes of ink and provides an improved pressure regulation capability over the currently known foam and felt systems which supply ink to ink jet printheads.

A further advantage of the present invention is the provision of an ink regulation system in which a valve element is supported on a movable support member held in a valve housing so that the valve member can reciprocate in relation to a valve seat and selectively allow a flow of ink into an ink chamber located in the valve housing. The valve responds to reduced ink pressure in the ink chamber upon ejection of ink therefrom by a head assembly to open and allow ink to flow into the ink chamber from a reservoir.

A still further advantage of the present invention is the provision of an ink regulation system in which an ink supply reservoir is located at a higher elevation than a valve housing so that ink can be supplied by gravity induced flow to the valve housing as regulated by a valve movably mounted in the valve housing.

A yet further advantage of the present invention is the provision of an ink regulation system in which an ink supply reservoir is pressurized so that ink is fed into a valve housing by pressurized flow as regulated by a valve movably mounted in the valve housing.

Still other benefits and advantages of the invention will become apparent to those skilled in the art upon a reading and understanding of the following detailed specification.

BRIEF DESCRIPTION OF THE DRAWINGS

The invention may take form in a certain structure preferred embodiments of which will be described in detail in the specification and illustrated in the accompanying drawings. In the drawings:

FIG. 2 is a side elevational schematic view of the office machine of FIG. 1 on a reduced scale;

FIG. 3 is an enlarged schematic view of a portion of the office machine of FIG. 2;

DETAILED DESCRIPTION OF THE PREFERRED EMBODIMENT

Figure 1:
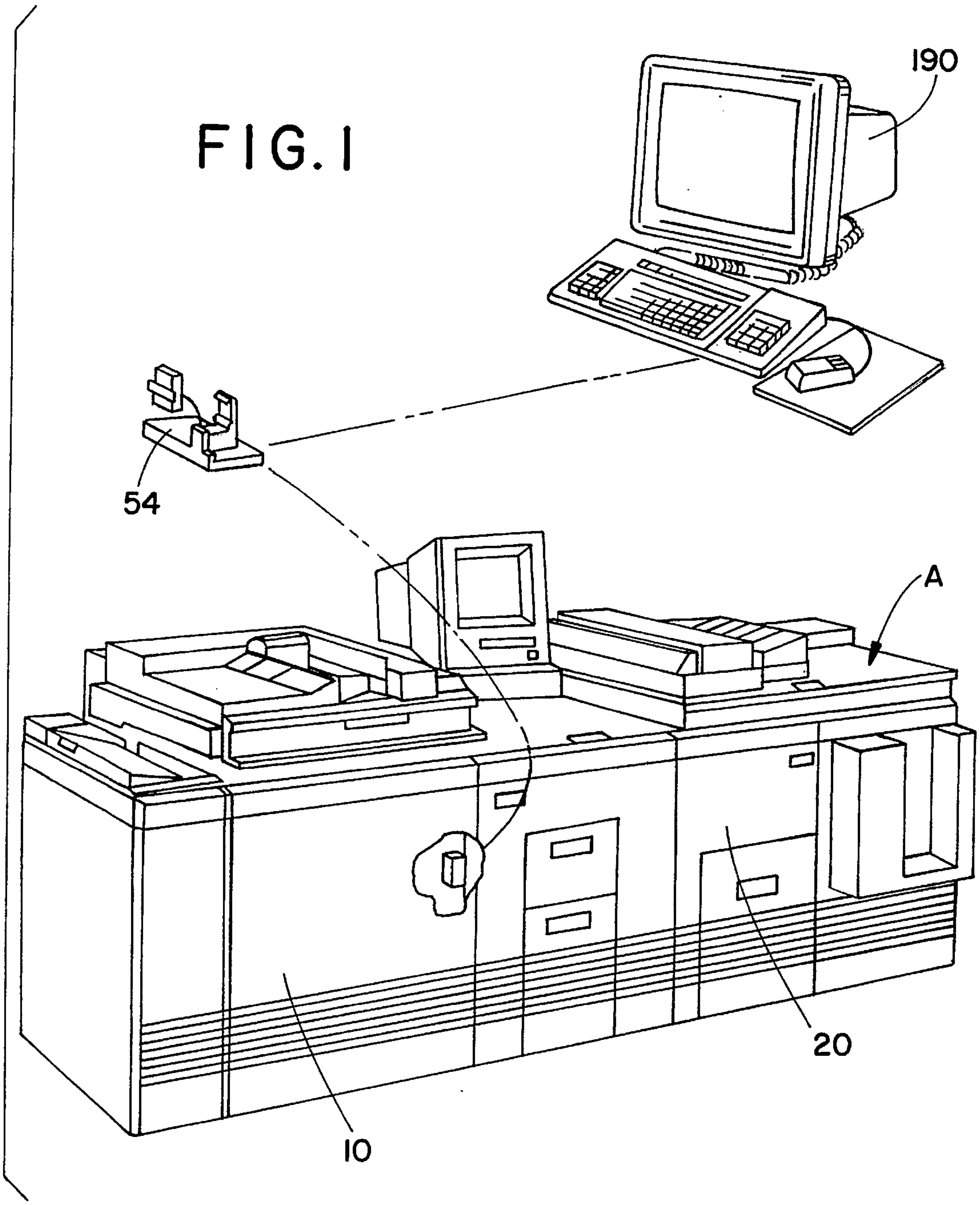
FIG. 1 is a perspective view, partially broken away, of an office machine which can employ the ink jet printhead according to the present invention.

Referring now to the drawings, wherein the showings are for purposes of illustrating preferred embodiments of the invention only and not for purposes of limiting same, FIG. 1 shows an office machine A which can employ an ink jet printhead having an ink regulation system according to the present invention. While the office machine is illustrated to be an electrophotographic printing apparatus in the form of a particular type of photocopier, it should be appreciated by those of average skill in the art that the ink regulation system disclosed herein could also be utilized for ink jet printheads employed in numerous other types of printing operations.

With reference now also to FIG. 2, the office machine A can comprise a first housing 10 containing a first sheet tray 12, a second sheet tray 14 and a third sheet tray 16 in spaced relationship to each other. Usually, these trays contain different sized sheets so that a sheet from a desired one of the trays can be fed along a first sheet path 18. The office machine can, if desired, also comprise a second housing 20 having a fourth sheet tray 22 contained therein. Sheets from the fourth sheet tray 22 can be transported via a second sheet path 24 into the first housing 10. The two sheet paths 18 and 24 merge to create a third sheet path 30. The third sheet path carries the sheets past a first printer 34. The sheets then continue to travel along the third sheet path 30 to an output station 38 which can, if desired, be located in the second housing 20.

With reference now also to FIG. 3, the first printer 34 can comprise an endless belt 42 of an electrostatographic printing apparatus. Sheets travel along the third sheet path 30 to an image transfer station 44 which transfers an image from the belt 42 to the sheet. After having been processed at the image transfer station 44, the sheets then travel to a vacuum transport station 46 and then to a fuser station 48. Located at the vacuum transport station 46 is a carriage assembly 52 containing an auxiliary printer cartridge 54.

The printer cartridge 54 can be a plug-in cartridge which can be selectively attached to and detached from the carriage assembly 52. It is noted that the carriage assembly 52 reciprocates across the width of the sheet transport station 46. This enables the printing of a desired piece of information onto the sheet at a desired location across the width of the sheet. In addition, as the sheet is moved longitudinally past the printer cartridge 54 by the sheet transport 46, the location of the printed image along the length of the sheet can also be controlled.

Figure 4:
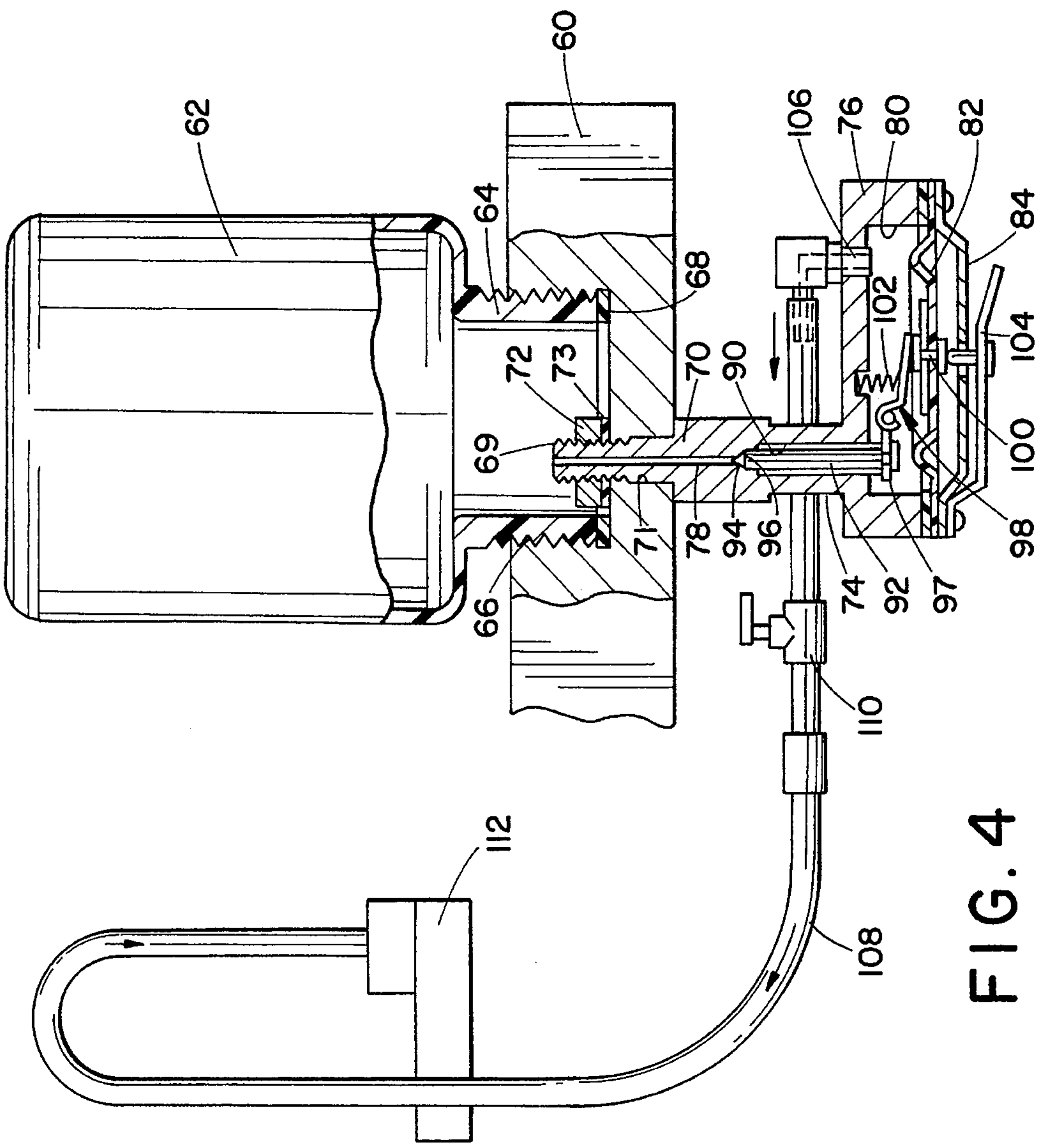
FIG. 4 is an enlarged side elevational view, partially in cross-section, of an ink regulation system for an ink jet printhead according to a first preferred embodiment of the present invention.

With reference now to FIG. 4, an ink regulation system for such a printer can include a cartridge frame 60 to which an ink container 62 can be selectively secured. The ink container includes a threaded mouth 64 which can be selectively secured in a threaded opening 66 in the frame 60. A gasket 68 is preferably trapped between the cartridge frame and the ink container in order to seal between these two elements and prevent the leakage of ink.

A threaded first end 69 of an ink transmission fitting 70 extends through a bore 71 in the cartridge frame 60. The threaded first end 69 of the fitting 70 cooperates with a nut 72 to secure the first end in place in the opening 66 of the frame 60. A gasket 73 is preferably trapped between the frame 60 and the nut 72 in order to seal the fitting against leakage. A second end 74 of the fitting 70 is secured to a valve housing 76. In the embodiment illustrated in FIG. 4, the fitting 70 is shown as being integral with the valve housing 76. It should be appreciated, however, that these two elements could be separate members which are merely secured to each other by any conventional means. A bore 78 extends longitudinally through the fitting 72 and communicates with an ink chamber 80 defined in the valve housing 76. Secured in the ink chamber is a flexible diaphragm 82. As can perhaps be best seen in FIG. 5, a base plate 84 is selectively removable from the housing 76 to afford access to the diaphragm 82.

Figure 5:
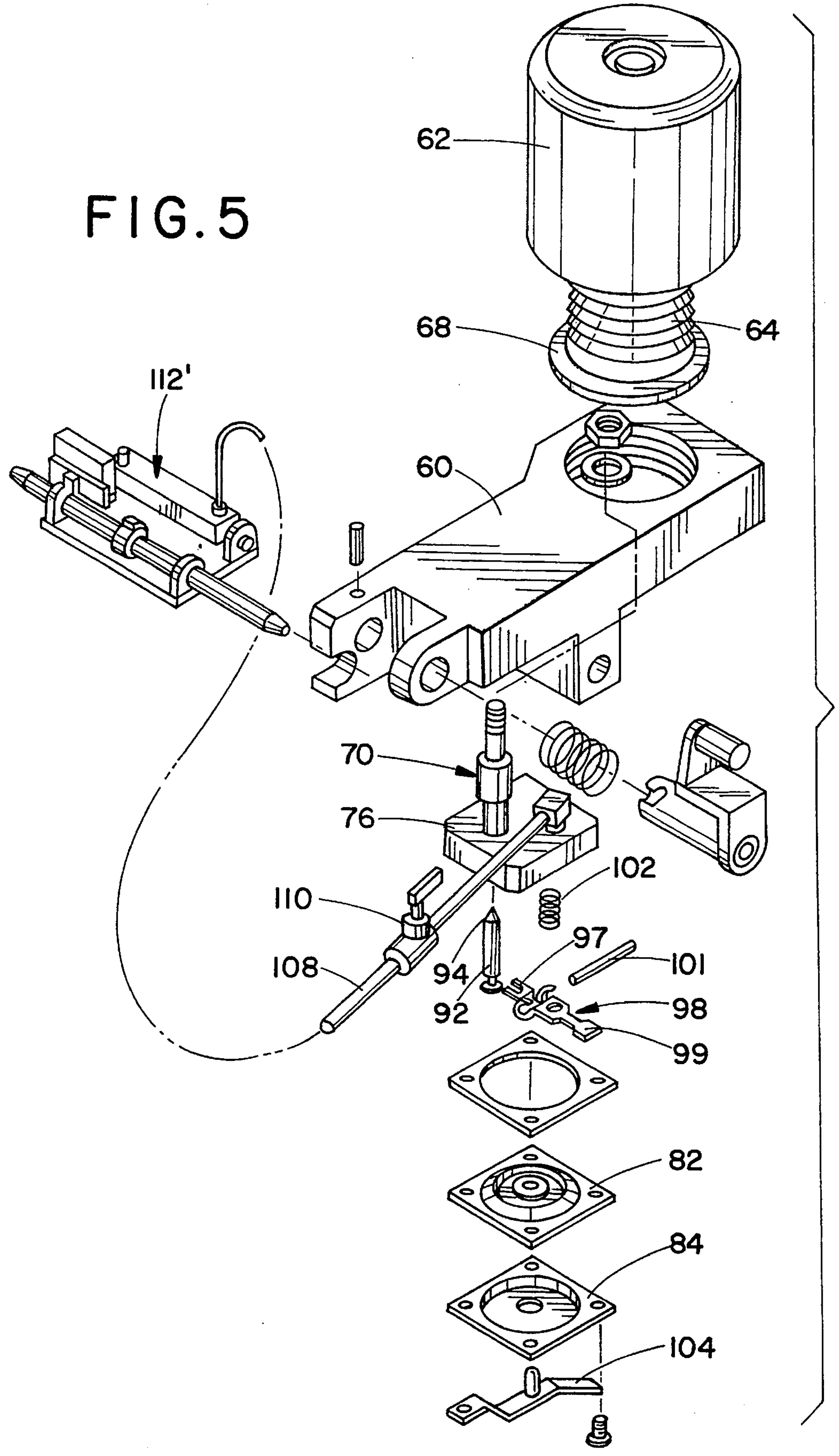
FIG. 5 is an exploded perspective view of the ink regulation system of FIG. 4 with another ink jet printhead.

The bore 78 in the fitting 72 includes a large diameter section 90 in which a needle valve 92 is adapted to reciprocate. The needle valve has a conically tapered valve end 94 as is best seen in FIG. 5. The valve end 94 is selectively seated on a valve seat 96 defined in the fitting 70. A first end 97 of a pivotable link means 98 can be selectively secured to a base end of the needle valve 92. A second end 99 of the link means is secured to a diaphragm stud 100. The link means 98 is pivotable on a pin 101 mounted in the valve housing 76. A spring 102 biases the link in a first direction. This arrangement allows for movement of the needle valve 92 as the diaphragm 82 moves up and down in the ink chamber 80. A prime button 104 is secured to the housing 76 in order to prime the valve at the beginning of the operation of the ink jet printhead. The movement of the needle valve 92, i.e. its reciprocation in the bore 78 of the fitting 72, can be set by changing the spring ratio of the spring 102 as well as the particular geometry of the link means 98. This allows the valve to open at the desired negative pressure.

One advantage of a diaphragm is that it will operate in any orientation. Therefore, it would be conceivable to replace the ink container 62, which is illustrated to be a plastic jar, with, e.g. a collapsible bag which could be secured to the housing by conventional means and could be positively pressurized by any conventional means and still employ the same diaphragm arrangement as is illustrated in FIGS. 4 and 5.

In other words, this system can be used with the ink supply below the diaphragm valve and with the ink pressurized or pumped into the ink chamber 80. However, in the version illustrated in FIGS. 4 and 5, a gravity feed is employed because the ink container 62 is located at a higher elevation than is the valve housing 76 so that ink can be supplied by gravity induced flow into the valve housing as regulated by the needle valve 92.

A diaphragm valve is advantageous in this construction because diaphragm valves are particularly suited for use in environments which require high purity and which must remain free from contamination. The body of the valve housing 76 can be made of a metallic material, as is illustrated in FIG. 4, or a plastic material. The diaphragm is generally made of an elastomeric material which can be either some form of natural or artificial rubber or a suitable conventional plastic. In addition, the diaphragm can, if desired, have a metallic section.

Extending from the valve housing 76 is an outlet 106 which communicates with a conduit 108. The conduit preferably has a shut-off valve 110 therein to selectively prevent ink flow out of the ink chamber 80. As shown in FIG. 4, a second end of the ink conduit is secured to a head assembly 112.

The valving system illustrated responds to reduced ink pressure in the valve housing ink chamber 80 upon ejection of ink therefrom by the head assembly 112 to open and admit ink into the ink chamber by flow from the reservoir 62 through the fitting 70. The valve member 92 has an opening pressure greater than the hydrostatic pressure of ink held in the chamber 62. The valve member responds to reduced ink pressure in the ink chamber 80 such that the diaphragm is raised and the link 98 pulls the valve 92 downwardly as the link pivots around pin 101 thereby opening the valve and allowing ink to flow through the bore 78 and into the ink chamber 80. As the diaphragm is distended downwardly, the lever again pivots around pin 101 and pushes the valve member 92 upwardly thereby seating the valve end 94 against the valve seat 96 cutting off further ink flow.

It should be noted that the head assembly 112 in FIG. 4 is illustrated as being located at a higher elevation than is the ink chamber. This provides a "chicken feeder" style ink delivery system so that if the valve 92 failed, the ink would only flow to a given height and not continue to run out of the system and flood. In contrast, FIG. 5 illustrates a head assembly 112' which is merely secured to the housing 60.

Figure 6:
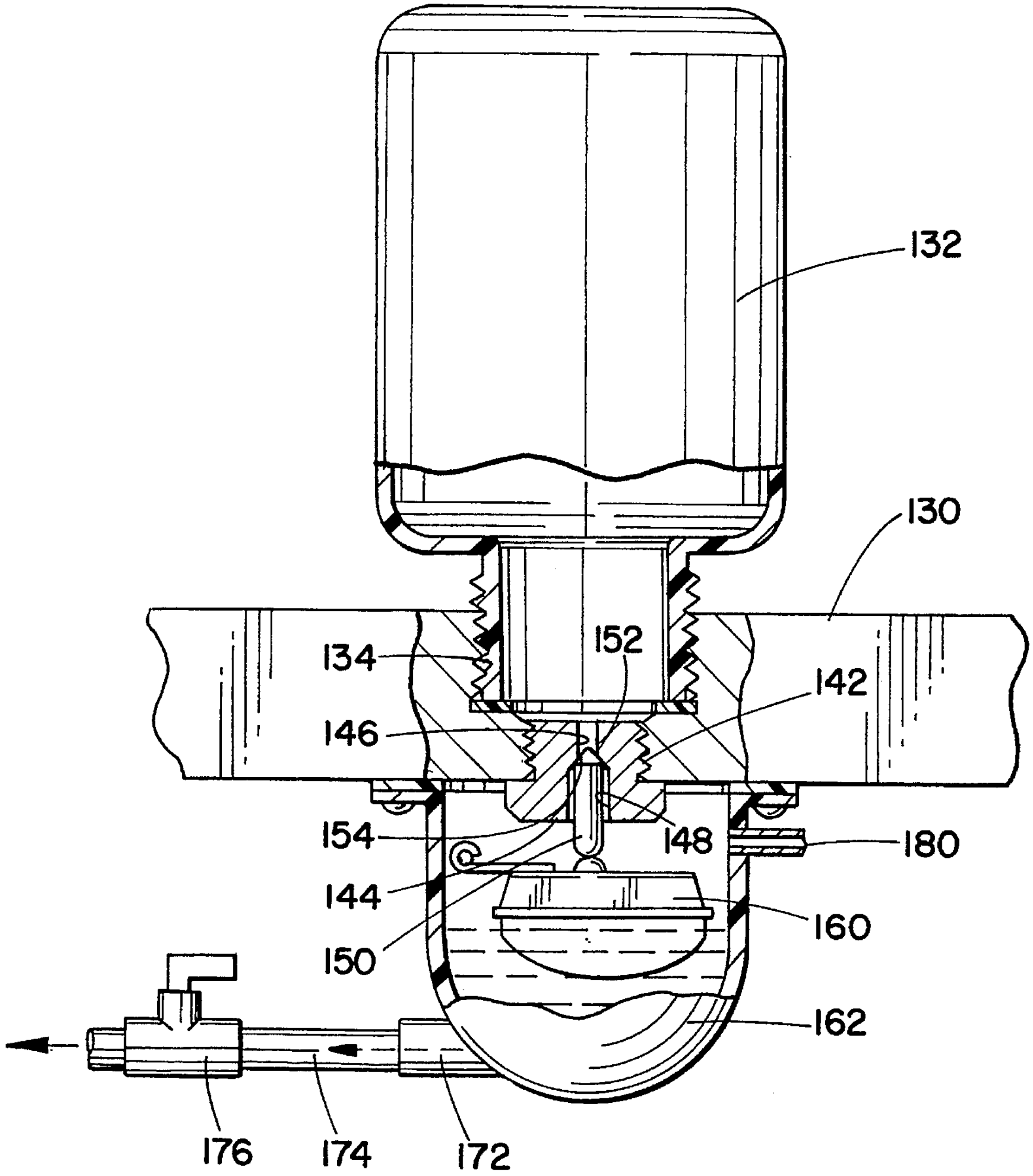
FIG. 6 is a side elevational view, partially broken away, of an ink regulation system for an ink jet printhead according to a second preferred embodiment of the present invention; and, FIG. 7 is an exploded perspective view of the ink regulation system of FIG. 6.

With reference now to FIG. 6, a second preferred embodiment of an ink jet printhead according to the present invention is there illustrated. In this embodiment, a cartridge frame 130 can selectively accommodate an ink container 132 such that a first threaded mouth 134 of the ink container is selectively held in a threaded opening 136 defined in the cartridge frame 130. A gasket 138 is preferably positioned between the ink container and the cartridge frame in order to seal these two elements against each other.

In this embodiment, the cartridge frame 130 also comprises a second threaded mouth 142. This second mouth can be coaxial with the first threaded mouth 134 so that the apertures defined by the two mouths communicate with each other. Selectively secured in the second mouth 142 is a fitting 144. Extending axially through the fitting is a bore 146. The bore includes a large diameter section 148 in which a needle valve 150 can reciprocate. The needle valve preferably has a conically tapered valve end 152 which can be selectively seated on a valve seat 154 defined in the fitting 144.

Figure 7:
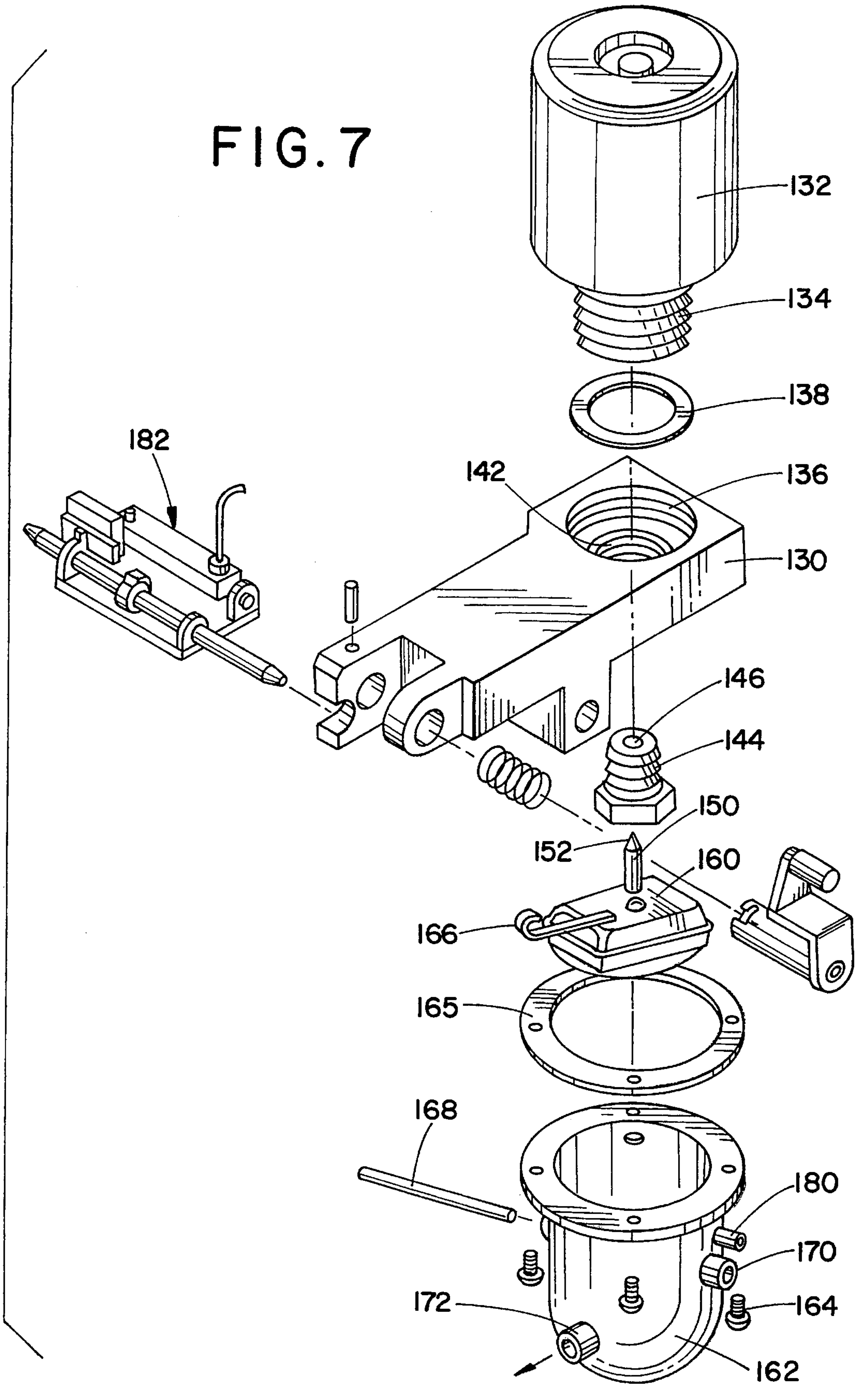

A base end of the needle valve 150 is supported on a float 160 which is pivotally mounted in a float bowl 162. As shown in FIG. 7, the bowl is, in turn, mounted by fasteners 164 to the cartridge frame 130 with a gasket 165 trapped therebetween in order to provide a seal. An ear 166 extends away from the float 160. The ear is mounted on a pivot 168 in order to allow the float 160 to ride up and down on the liquid held in the bowl 162. To this end, a pair of pivot supports 170 are defined on opposed sides of the float bowl 162.

As illustrated in FIG. 6, an outlet 172 of the float bowl can communicate with an ink conduit 174 in order to direct ink to a head assembly of the type illustrated previously. A shut-off valve 176 is preferably provided in the conduit 174. Also provided is a vent 180 in order to vent the float bowl to the atmosphere. Whereas the ink regulation system disclosed in the embodiment of FIGS. 6 and 7 is vented to the atmosphere, it should be appreciated that the system in the embodiment of FIGS. 4 and 5 requires no vent as it does not communicate with the atmosphere.

The float bowl regulates the level of ink and that level is selected to be of the proper height relative to the printhead. Ink flows into the bowl 162 past the needle valve 150 whenever the float 160 drops enough in the bowl to let the needle come off the seat 154. As the ink flows into the bowl 162, the level of ink rises in the bowl thereby lifting the float 160. This pushes the needle valve 150 upwardly in the fitting 144 such that the valve end tip 152 thereof mates with the valve seat 154 defined in the fitting thereby shutting off any further flow of ink. In order for this system to function correctly, the bowl 162 must always be located below the ink container 132. Adjustment of the desired ink level in the bowl 162 can be accomplished by provision of a suitably configured arm 166 for the float 160.

Both of the embodiments of FIGS. 4–5 and 6–7 provide an improved pressure regulation capability over the currently known foam and felt ink supply systems used for ink jet printheads. They also avoid the possible contamination of the ink supply by foreign matter in the foams and felts presently used.

The embodiments of ink regulation systems illustrated in FIGS. 4–7 are capable of handling large volumes of ink on the order of 400 cubic centimeters of ink which may be held in the containers 62 or 132. This volume is ten times the volume of ink which is held in conventional containers mounted next to the currently known felt and foam ink delivery systems. With such a large volume of ink, the ink cannot be stored immediately next to the ink jet printhead. Since the ink needs to be stored away from the ink jet printhead, felt and foam systems become impractical because felt and foam systems need to be located next to the ink supply and also located next to the ink jet printhead. Therefore, new types of valving systems needed to be developed and such systems are illustrated in FIGS. 4–7. In addition, the ink jet regulation systems disclosed herein are able to generate the negative pressure necessary to supply ink to printheads which are spaced away from the ink containers.

The volumes of ink held in the containers 62 or 132, i.e. 400 cubic centimeters, would be adequate for approximately a month of printing when employing the printheads disclosed herein in the office machines disclosed herein.

The information to be printed by the printheads 112 and 112' illustrated in FIGS. 4 and 5 and by the printhead 182 illustrated in FIG. 7 can be controlled by a suitable computer, such as the computer 190 illustrated in FIG. 1. In this way, the desired information can be printed on a sheet by the printhead as may be programmed for a particular job.

The invention has been described with reference to preferred embodiments. Obviously, modifications and alterations will occur to others upon the reading and understanding of this specification. It is intended to include all such modifications and alterations insofar as they come within the scope of the appended claims or any equivalents thereof.

We claim:

1. An ink regulation system for an ink jet printhead, comprising:

a mounting frame;

an ink supply reservoir secured to said mounting frame;

a valve housing operably secured to said mounting frame, said valve housing including an ink chamber;

a fitting supported in said mounting frame and including a bore having a first end communicating with said ink supply reservoir and a second end communicating with said valve housing for feeding ink from said ink supply reservoir to said ink chamber, said fitting including a valve seat in said bore;

a valve member located in said valve housing, said valve member having a sealing surface for cooperating with said valve seat to selectively seal thereagainst and prevent a flow of ink into said valve housing ink chamber; and, a support means located in said valve housing ink chamber for supporting said valve member so that said valve member can reciprocate in relation to said valve seat to selectively allow a flow of ink into said valve housing ink chamber, said valve member responding to reduced ink pressure in said valve housing ink chamber upon ejection of ink therefrom to open and admit ink to said ink chamber by flow from said reservoir through said fitting bore.

2. The system of claim 1 further comprising:

an ink conduit connected at one end to said valve housing and communicating with said ink chamber; and, a shut off valve located in said ink conduit for selectively allowing a flow of ink therethrough.

3. The system of claim 1 wherein said support means comprises a diaphragm and further comprising a prime button secured to said diaphragm for selectively priming the system by filling said valve housing ink chamber.

4. The system of claim 1 wherein said support means comprises an elastic diaphragm secured around the circumference of said support means to said valve housing and further comprising a linkage for securing said valve member to said diaphragm.

5. The system of claim 1 wherein said ink supply reservoir is located at a higher elevation than said valve housing for supplying ink by gravity induced flow to said valve housing.

6. The system of claim 1 wherein said valve housing comprises a bowl and said support means comprises a float pivotally secured in said bowl.

7. An ink jet printhead comprising:

a mounting frame;

a valve housing secured to said mounting frame, said valve housing including an ink chamber;

an ink supply reservoir secured to said mounting frame;

a head assembly;

an ink transmission tube having a first end connected to said valve housing and a second end connected to said head assembly for feeding ink from said valve housing to said head assembly;

an ink supply fitting supported in said mounting frame and including a bore having a first end communicating with said ink supply reservoir and a second end communicating with said valve housing for feeding ink from said ink supply reservoir to said valve housing ink chamber, said fitting including a valve seat in said bore;

a valve member mounted for reciprocation in said ink supply fitting bore for selectively sealing against said valve seat in said fitting; and, a support means located in said valve housing ink chamber for supporting said valve member so that said valve member can reciprocate in relation to said valve seat to selectively allow a flow of ink into said valve housing ink chamber, said valve member responding to reduced ink pressure in said valve housing ink chamber upon ejection of ink therefrom by said head assembly to open and admit ink to said housing ink chamber by flow from said reservoir through said ink supply fitting, said valve member having an opening pressure greater than the hydrostatic pressure of ink in said reservoir.

8. The printhead of claim 7 wherein said ink supply reservoir is located above said valve housing and wherein said valve member opens to admit ink into said valve housing ink chamber by gravity induced flow from said reservoir.

9. The printhead of claim 7 wherein said ink supply reservoir is positively pressurized and wherein said valve member opens to admit ink into said opening by pressure induced flow from said reservoir.

10. The printhead of claim 7 further comprising a shut off valve located in said ink transmission line for selectively allowing a flow of ink therethrough.

11. The printhead of claim 7 wherein said support means comprises an elastic diaphragm secured around the circumference of said support means to said valve housing.

12. The printhead of claim 11 further comprising a prime button secured to said valve housing for selectively priming said valve member.

13. The printhead of claim 7 wherein said head assembly is located at a higher elevation than a lower end of said ink supply reservoir to prevent ink from draining out of said reservoir in case of valve failure.

14. The printhead of claim 7 wherein said valve housing comprises a bowl and said support means comprises a float located in said bowl.

15. The printhead of claim 14 further comprising a pin mounted in said bowl and a finger extending from said float and cooperating with said pin to pivotally mount said float in said bowl.

16. A method for regulating a flow of ink from an ink supply reservoir to an ink jet printhead comprising the steps of:

providing an ink supply reservoir and a valve housing including a valve member and a support element located in the valve housing and supporting the valve member;

communicating the ink supply reservoir with the valve housing through a path; and, moving the support element in the valve chamber to move the valve member and allow a flow of ink through the path into the valve chamber in response to a reduced level of ink in the valve housing.

17. The method of claim 16 further comprising the step of inducing a gravity aided flow of ink from the ink supply reservoir into the valve housing when the valve member moves.

18. The method of claim 16 further comprising the step of positively pressurizing the ink supply and wherein the valve member opens to admit ink into the valve housing by pressure induced flow from the reservoir.

19. The method of claim 16 further comprising the step of ejecting ink by a head assembly, wherein said step of moving the support element is in response to a reduced ink level in the valve housing caused by the step of ejecting ink.

20. The method of claim 16 wherein said step of moving the support element comprises the subsidiary step of pivoting the support element.

* * * * *